(12) United States Patent
Lee et al.

(10) Patent No.: US 10,718,563 B2
(45) Date of Patent: Jul. 21, 2020

(54) REFRIGERATOR

(71) Applicant: Samsung Electronics Co., Ltd, Gyeonggi-do (KR)

(72) Inventors: Jae Bok Lee, Seongnam-si (KR); Sang Chul Ryu, Gwangju (KR); Jin Kyu Seon, Suwon-si (KR); Yong Bo Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/826,454

(22) Filed: Nov. 29, 2017

(65) Prior Publication Data
US 2018/0149416 A1 May 31, 2018

(30) Foreign Application Priority Data

Nov. 30, 2016 (KR) .................... 10-2016-0161965

(51) Int. Cl.
| | | |
|---|---|---|
| *F25D 3/02* | (2006.01) | |
| *F25D 23/12* | (2006.01) | |
| *F25C 5/20* | (2018.01) | |
| *F25D 25/02* | (2006.01) | |
| *B01D 29/96* | (2006.01) | |
| *B01D 35/02* | (2006.01) | |

(Continued)

(52) U.S. Cl.
CPC ........... *F25D 23/126* (2013.01); *B01D 29/96* (2013.01); *B01D 35/02* (2013.01); *B01D 35/153* (2013.01); *B01D 35/30* (2013.01); *C02F 1/003* (2013.01); *F25C 5/22* (2018.01); *F25D 25/025* (2013.01); *C02F 1/283* (2013.01); *C02F 2307/10* (2013.01); *C02F 2307/12* (2013.01); *F25D 2323/121* (2013.01); *F25D 2323/122* (2013.01)

(58) Field of Classification Search
CPC ........ B01D 35/02; B01D 29/96; B01D 35/30; B01D 35/153; F25C 5/22; C02F 1/003; C02F 2307/12; C02F 1/283; C02F 2307/10; F25D 2323/121; F25D 2323/122; F25D 23/126; F25D 25/025
See application file for complete search history.

(56) References Cited

U.S. PATENT DOCUMENTS

| | | |
|---|---|---|
| 8,152,255 B2 | 4/2012 | Nam et al. |
| 2007/0012611 A1 | 1/2007 | An |

(Continued)

FOREIGN PATENT DOCUMENTS

| | | |
|---|---|---|
| EP | 2405220 A1 | 1/2012 |
| KR | 20040085251 A | 10/2004 |

(Continued)

OTHER PUBLICATIONS

International Search Report regarding Application No. PCT/KR2017/013033, dated Mar. 16, 2018, 3 pages.

(Continued)

*Primary Examiner* — Henry T Crenshaw
*Assistant Examiner* — Kamran Tavakoldavani

(57) ABSTRACT

A refrigerator includes a storeroom configured to have a pantry install part. The refrigerator also includes a pantry arranged in the pantry install part. The refrigerator also includes a filter case configured to receive a water filter and arranged in the pantry install part to be covered by the pantry.

19 Claims, 16 Drawing Sheets

(51) Int. Cl.
*B01D 35/153* (2006.01)
*B01D 35/30* (2006.01)
*C02F 1/00* (2006.01)
*C02F 1/28* (2006.01)

(56) References Cited

U.S. PATENT DOCUMENTS

| | | | |
|---|---|---|---|
| 2009/0277210 A1 | 11/2009 | Eveland et al. | |
| 2012/0006046 A1* | 1/2012 | An | F25D 23/126 62/318 |
| 2012/0285192 A1* | 11/2012 | Mitchell | C02F 1/003 62/318 |
| 2012/0304679 A1 | 12/2012 | Krause et al. | |
| 2016/0187051 A1 | 6/2016 | Lim et al. | |
| 2016/0341462 A1* | 11/2016 | Kim | F25D 23/068 |

FOREIGN PATENT DOCUMENTS

| | | |
|---|---|---|
| KR | 20080054842 A | 6/2008 |
| KR | 20090095758 A | 9/2015 |

OTHER PUBLICATIONS

European Patent Office, "Supplementary European Search Report," Application No. 17876295.1, dated Sep. 20, 2019, 9 pages.

\* cited by examiner

REFRIGERATOR

CROSS-REFERENCE TO RELATED APPLICATION

The present application is related to and claims priority to Korean Patent Application No. 10-2016-0161965 filed on Nov. 30, 2016, the disclosure of which is incorporated herein by reference in its entirety.

TECHNICAL FIELD

The present disclosure relates to refrigerators, and more particularly, to a refrigerator including a water filtration system.

BACKGROUND

Recent refrigerators include ones having a dispenser for supplying water or an ice maker for automatically making ice.

The refrigerators having the dispenser or the ice maker may include a water supplying system for supplying water to be used in the dispenser or the ice maker.

The refrigerator having the water supplying system also includes a water filter configured to filter out foreign materials contained in the water supplied from an external water source and then supply the filtered water to the dispenser or the ice maker.

The water filter includes a filter capable of adsorbing foreign materials, such as a carbon block, and the foreign materials filtered out from the water are accumulated in the filter from the use of the filter.

Accordingly, the water filter is detachably installed in the refrigerator to be replaced by a new water filter after a period of use.

SUMMARY

To address the above-discussed deficiencies, it is a primary object to provide a refrigerator with an increased capacity of a storeroom.

Another aspect of the present disclosure provides a refrigerator that may cover a water filtration system with a pantry.

In accordance with an aspect of the embodiments, a refrigerator comprising: a storeroom configured to have a pantry install part; a pantry arranged in the pantry install part; and a filter case configured to receive a water filter and arranged in the pantry install part to be covered by the pantry.

Also, the pantry comprises a pantry box; and a pantry cover configured to cover the pantry box.

Also, at least a portion of the filter case is covered by the pantry box.

Also, the water filter is detachably installed in the filter case.

Also, a water tank connected to the water filter.

Also, the water tank is arranged in the pantry install part to be covered by the pantry.

Also, the water filter and the water tank are arranged perpendicularly to each other.

Also, the water filter is arranged in a front-back direction of the storeroom, and the water tank is arranged in a left-right direction of the storeroom.

Also, the pantry box comprises a filter container configured to receive the filter case.

Also, the filter container comprises a filter container body arranged in the pantry box to form a container room to receive the filter case.

Also, the filter container body comprises an opening formed for the filter case to be pulled in or pulled out.

Also, the opening is formed in at least a portion of the rear side of the pantry box.

In accordance with another aspect of the present disclosure, a refrigerator comprising: a storeroom; a pantry box arranged inside the storeroom; a filter case configured to receive a water filter and arranged in a front-back direction inside the storeroom; and a water tank connected to the water filter, wherein the filter case and the water tank are arranged to be covered by the pantry box.

Also, the water filter is detachably installed in the filter case.

Also, the pantry box comprises a filter container configured to receive the filter case.

Also, the filter container comprises a filter container body arranged in the pantry box to form a container room to receive the water filter, and an opening formed in the filter container body for the filter case to be pulled in or pulled out.

Also, a pantry cover configured to cover an upper portion of the pantry box.

Also, at least a portion of the water tank is covered by the pantry cover.

Also, a container cover detachably installed to cover the filter container.

Also, the opening is formed in at least a portion of the rear side of the pantry box.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
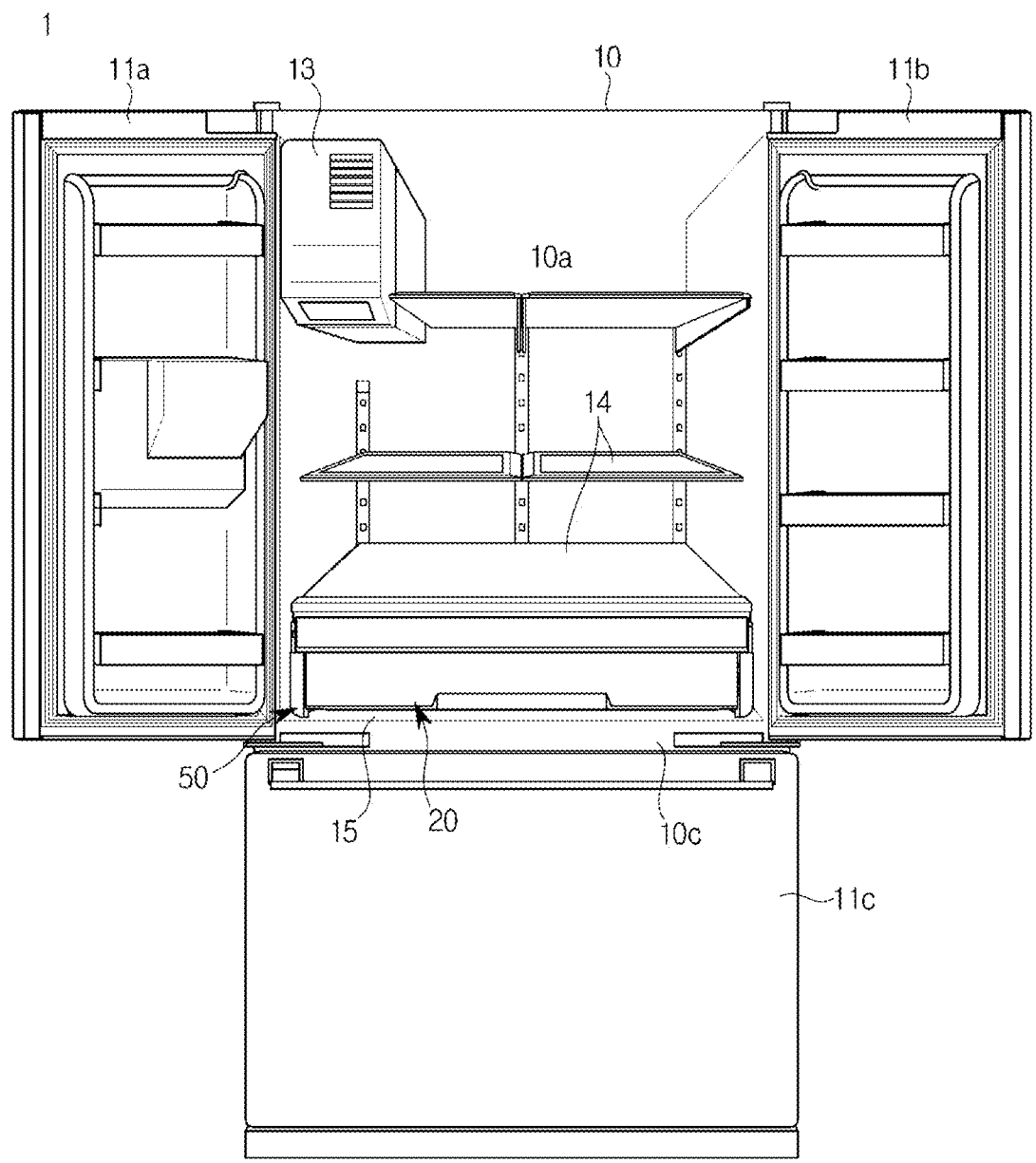
FIG. 1 illustrates a perspective view of a refrigerator, according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure.

Descriptions shall be understood as to include any and all combinations of one or more of the associated listed items when the items are described by using the conjunctive term "and/or," or the like.

Reference will now be made in detail to embodiments, examples of which are illustrated in the accompanying drawings, wherein like reference numerals refer to the like elements throughout.

Figure 2:
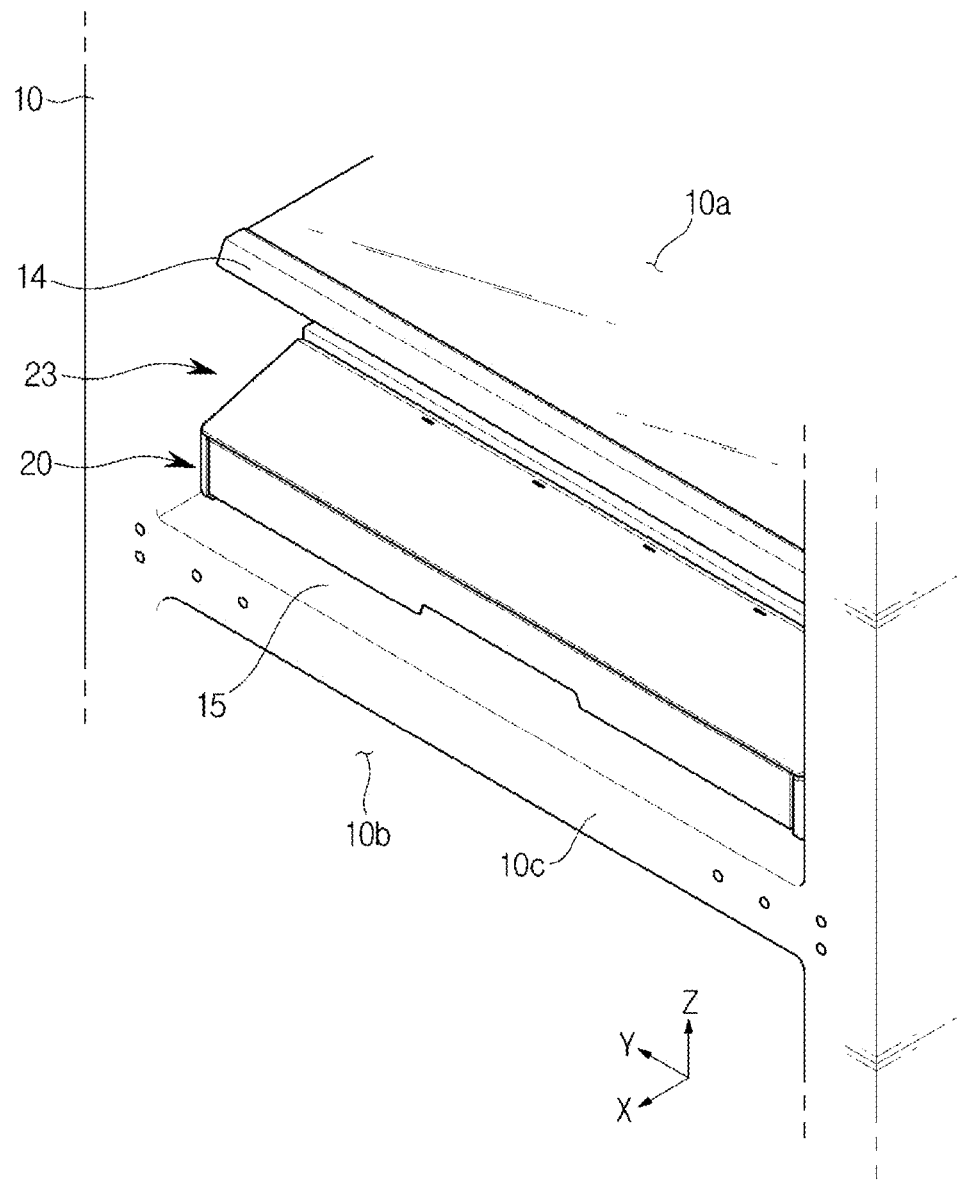
FIG. 2 illustrates a pantry installed in a refrigerator, according to an embodiment of the present disclosure.

FIG. 1 illustrates a perspective view of a refrigerator, according to an embodiment of the present disclosure, and FIG. 2 illustrates a pantry installed in a refrigerator, according to an embodiment of the present disclosure.

A refrigerator 1 shown in FIGS. 1 and 2 may include a main body 10 and storerooms 10a, 10b formed inside the main body 10. The storerooms 10a, 10b may include a refrigerating storeroom 10a and a freezing storeroom 10b, which are separated by a partition wall 10c horizontally formed in the middle of the interior of the main body 10.

The refrigerating room 10a has the open front. The opening of the refrigerating storeroom 10a may be combined with both ends of the main body 10 by hinges and opened or closed by a pair of doors 11a, 11b pivoting forward. The freezing storeroom 10b may be opened or closed by a sliding door 11c formed in a drawer type. Although the refrigerating room and the freezing room are shown to have hinged doors and a sliding door, respectively, in the embodiment of the present disclosure, the present disclosure is not limited thereto.

The refrigerating storeroom 10a may include at least one shelf 14. The refrigerating storeroom 10a may be partitioned by the at least one shelf 14 to receive food or dishes fit for the size of the at least one shelf 14. The at least one shelf 14 may be horizontally mounted in the refrigerating storeroom 10a.

In the top portion of the refrigerating storeroom 10a, an ice maker 13 may be arranged to make ice. In the bottom portion of the refrigerating storeroom 10a, a pantry 20 may be arranged. A pantry install part 15 may be arranged for the pantry 20 to be installed therein in the refrigerating storeroom 10a. The pantry install part 15 may be arranged on the bottom of the refrigerating storeroom 10a. The pantry install part 15 may be arranged on the top side of the partition wall 10c.

The pantry 20 may be installed in the pantry install part 15 of the refrigerating storeroom 10a. The pantry 20 may be configured in the bottom portion of the refrigerating storeroom 10a to store items such as food or dishes with big size. The pantry 20 may include a drawer to contain items. The pantry 20 may include a box to contain items. The pantry 20 may be configured to be pulled in and pulled out from the storeroom 10a, 10b.

Figure 3:
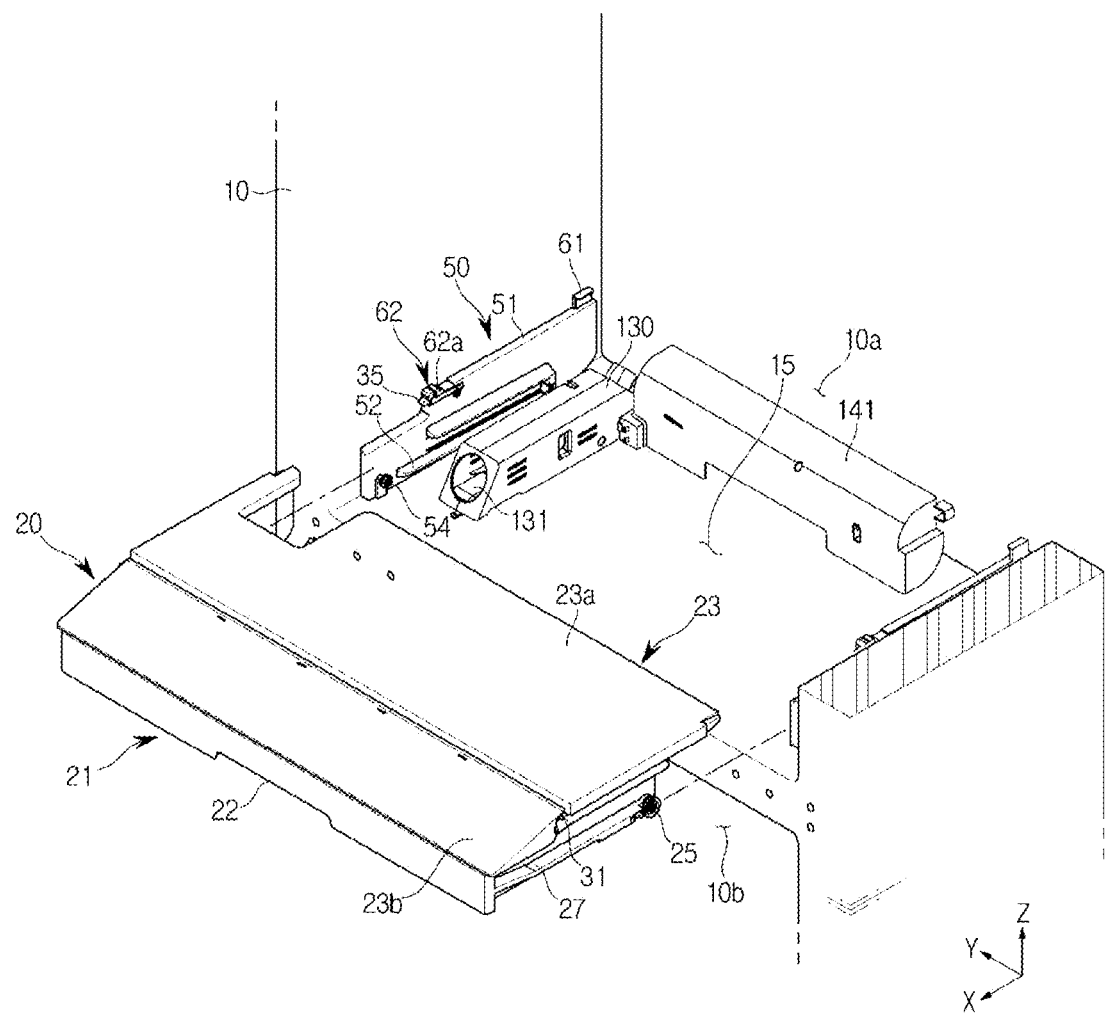
FIG. 3 illustrates a pantry installed in a pantry install part of a refrigerator, according to an embodiment of the present disclosure.
Figure 4:
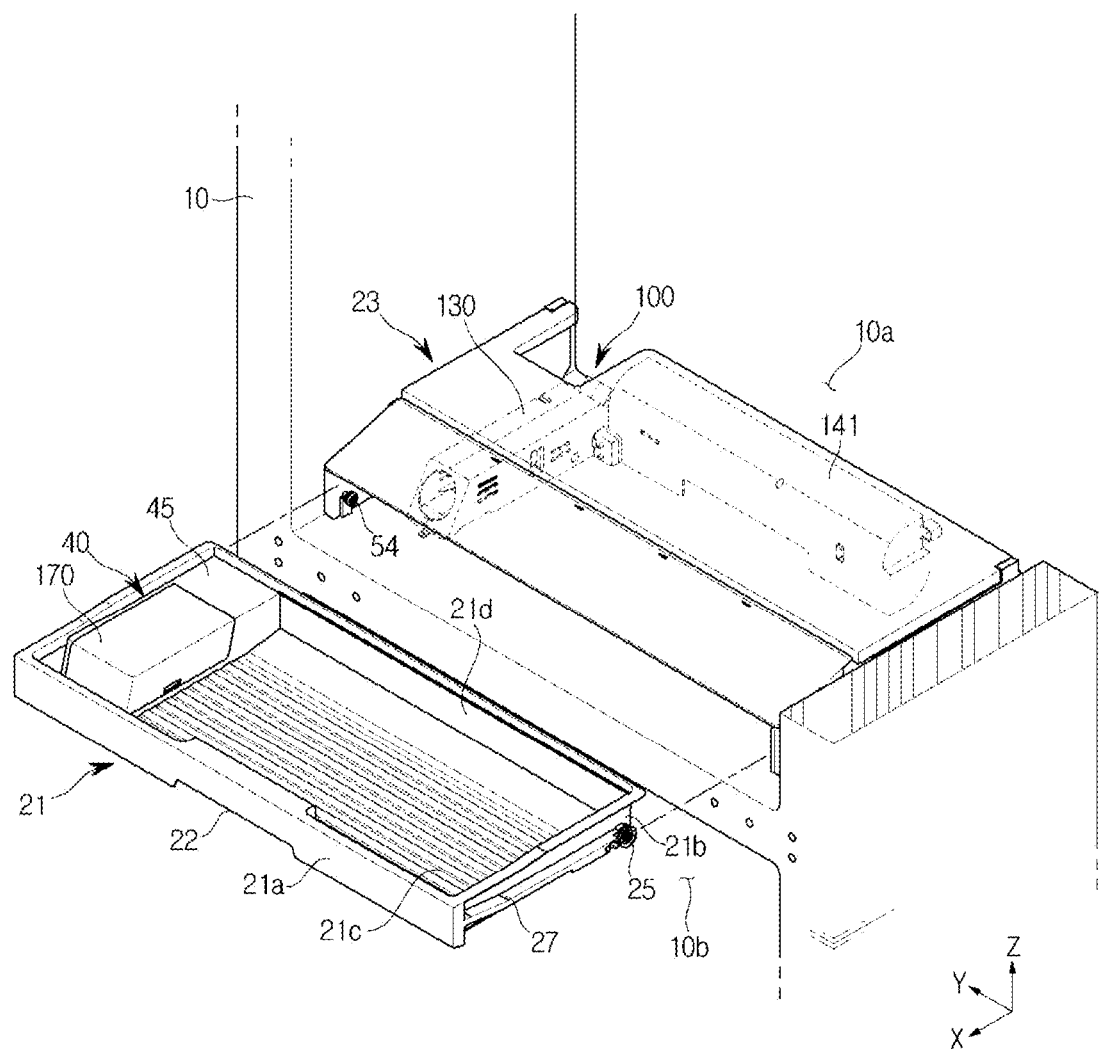
FIG. 4 illustrates a pantry cover and a pantry box of a pantry installed in a pantry install part, according to an embodiment of the present disclosure.
Figure 5:
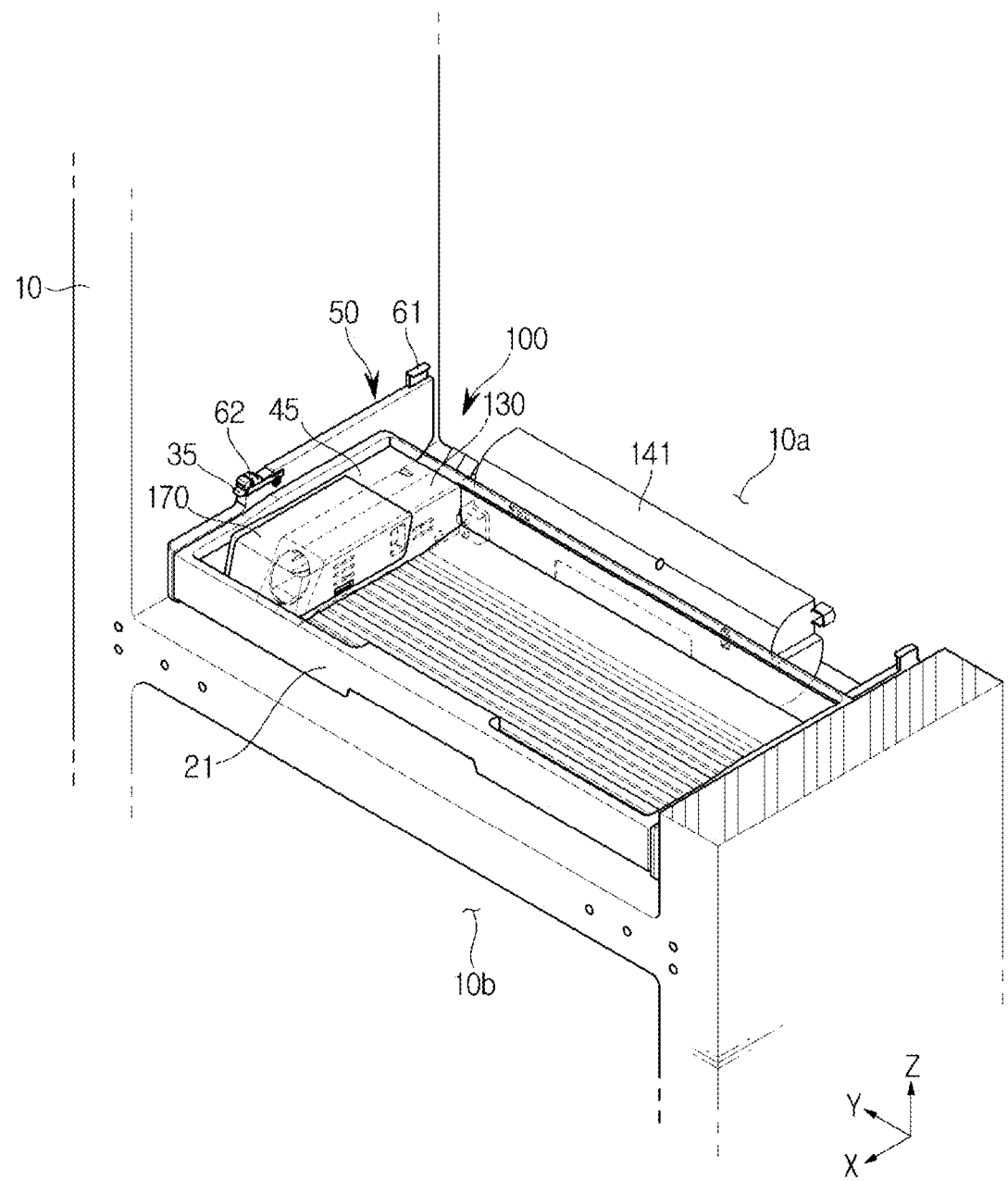
FIG. 5 illustrates a perspective view of a pantry, according to an embodiment of the present disclosure.
Figure 6:
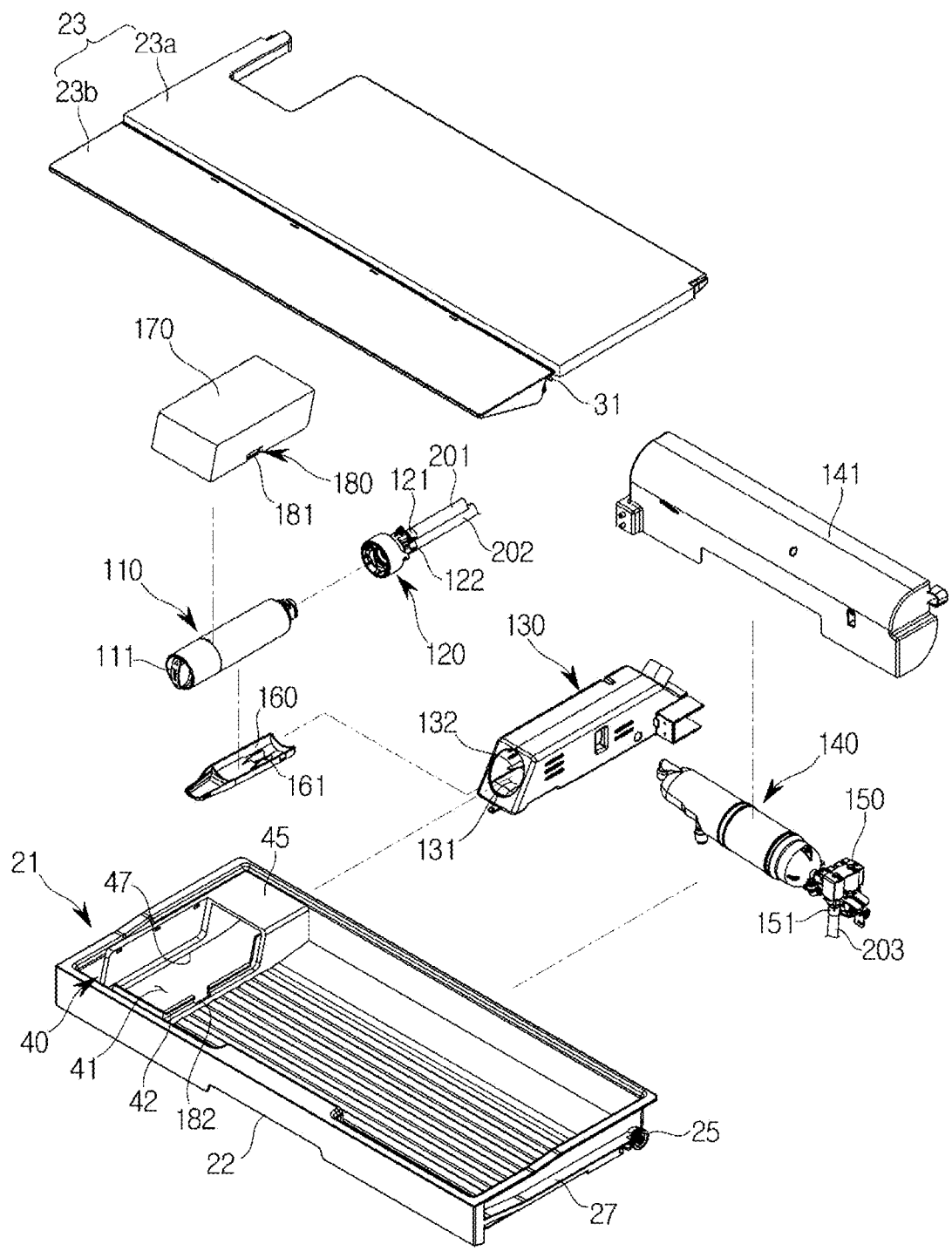
FIG. 6 illustrates an exploded view of a pantry and a water filtration system, according to an embodiment of the present disclosure.
Figure 7:
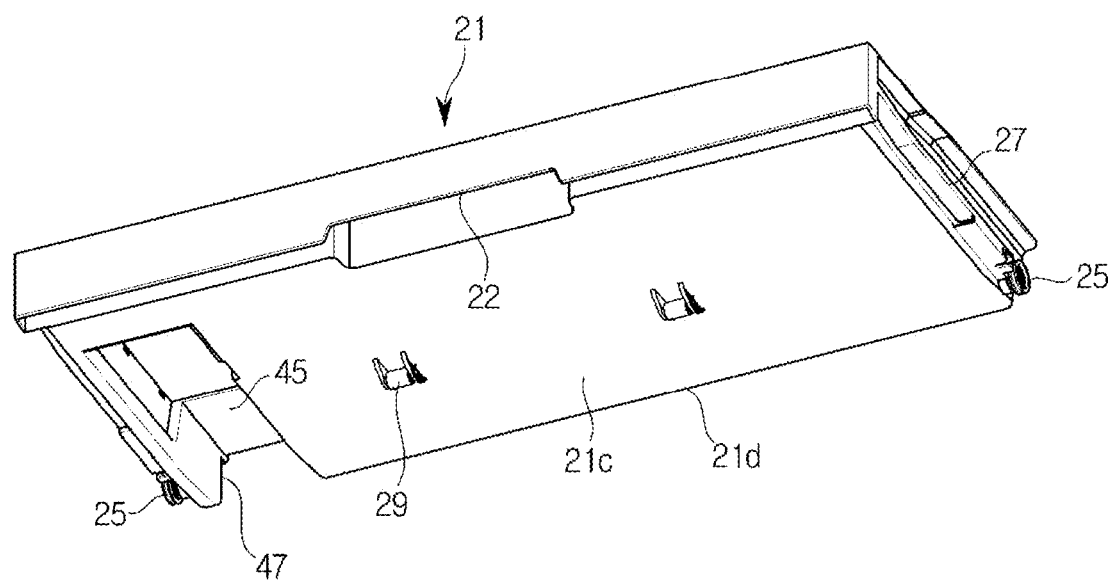
FIG. 7 illustrates a pantry box, according to an embodiment of the present disclosure.
Figure 8:
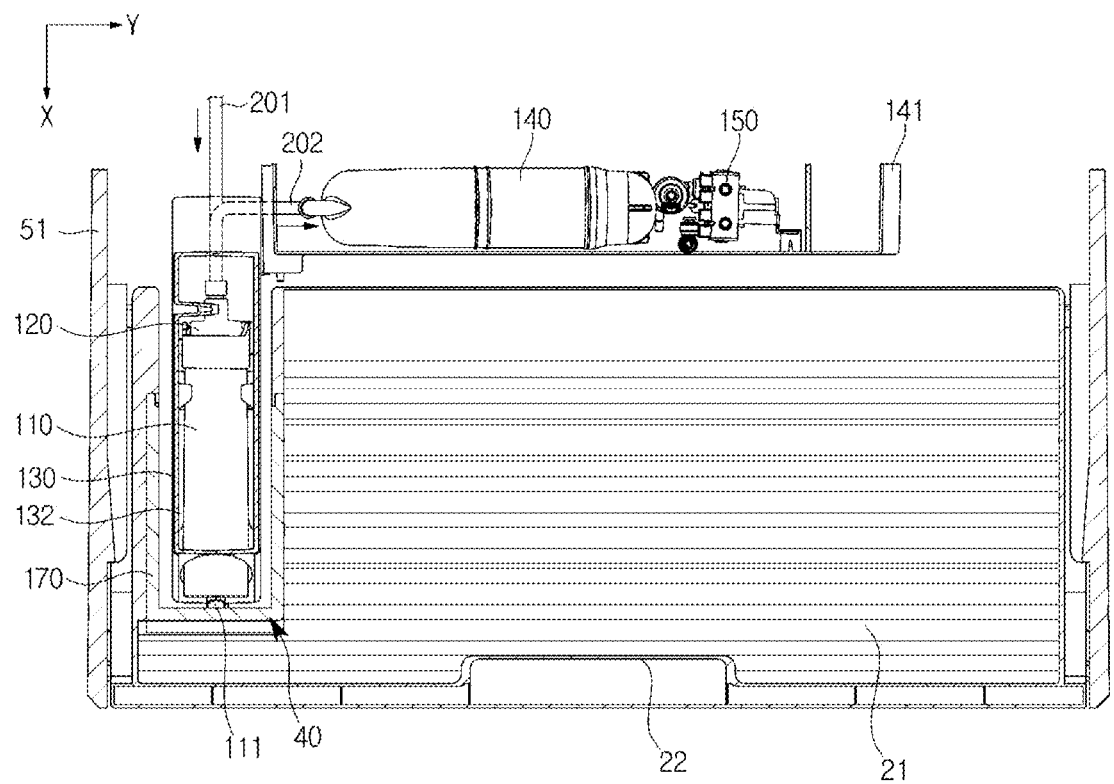
FIG. 8 illustrates a pantry and a water filtration system, according to an embodiment of the present disclosure.

FIG. 3 illustrates a pantry installed in a pantry install part of a refrigerator, according to an embodiment of the present disclosure, FIG. 4 illustrates a pantry cover and a pantry box of a pantry installed in a pantry install part, according to an embodiment of the present disclosure, FIG. 5 illustrates a perspective view of a pantry, according to an embodiment of the present disclosure, FIG. 6 illustrates an exploded view of a pantry and a water filtration system, according to an embodiment of the present disclosure, FIG. 7 illustrates a pantry box, according to an embodiment of the present disclosure, and FIG. 8 illustrates a pantry and a water filtration system, according to an embodiment of the present disclosure.

As shown in FIGS. 3 to 8, the pantry 20 may include a pantry box 21 and a pantry cover 23. The pantry cover 23 may be arranged on top of the pantry box 21.

The pantry 20 is installed to be movable in the front-back direction of the refrigerating storeroom 10a (hereinafter, called a first direction X). That is, the pantry box 21 is installed to be movable in the first direction X of the refrigerating storeroom 10a. The pantry 20 may be formed to have a size corresponding to the width of the refrigerating storeroom 10a in the left-right direction (hereinafter, called a second direction Y). That is, the pantry box 21 may be formed to have a size corresponding to the width of the refrigerating storeroom 10a in the second direction Y.

The pantry box 21B may be shaped like a box with the open top. The pantry box 21 may include a front plate 21a, a rear plate 21d, left and right plates 21b, and a bottom plate 21c.

The pantry box 21B may have a handle 22 formed thereon. The handle 22 of the pantry box 21 may be formed on the front plate 21a. The handle 22 may be formed for the user to grab the handle 22 to easily move the pantry box 21 in the first direction X.

Rail members 50 may be arranged in the refrigerating storeroom 10a to guide the movement of the pantry box 21. The rail members 50 may be arranged on left and right inner sides of the refrigerating storeroom 10a. The rail members 50 may be installed in the pantry install part 15 of the refrigerating storeroom 10a.

The rail members 50 may include rail bodies 51 installed on the inner sides of the refrigerating storeroom 10a. Rails 52 may be arranged on the rail bodies 51. The rails 52 may be arranged in the first direction X on the rail bodies 51. The rails 52 may be arranged to protrude from the rail bodies 51.

On the rail body 51, there may be a first cover install part 61 and a second cover install part 62 arranged to install the pantry cover 23, as will be described later. A guide roller 54 may also be installed on the rail body 51 to guide the movement of the pantry box 21. The guide roller 54 may be arranged in front of the rail 52.

A roller 25 may be arranged in the pantry box 21 to be combined with the rail 52 of the rail member 50. The roller 25 may be installed on each of the left and right side plate 21b of the pantry box 21. The roller 25 may be able to move in the front-back direction of the refrigerating storeroom 10a along the rail 52.

The pantry box 21 may also be equipped with guide rails 27. The guide rail 27 is configured to support the guide roller 54 to be able to roll. The guide rail 27 may be arranged on each of the left and right side plate 21b of the pantry box 221 in the first direction X.

The pantry box 21 may also have a roller 29 to move the pantry box 21. The roller 29 may be installed on the bottom plate 21c of the pantry box 21. The roller 29 may be installed to be able to roll on the outer side of the bottom plate 21c. One or more moving rollers 29 may be installed (see FIG. 7).

A filter container 40 may be arranged in the pantry box 21. The filter container 40 is configured to receive a filter case 130. The filter container 40 may include a filter container body 45 that forms a container room 41 to receive the filter case 130.

The filter container body 45 may be formed on the inner corner connecting the side plate 21b and the rear plate 21d of the pantry box 21. The filter container body 45 forms the container room 41 to receive the filter case 130. The filter case 130 may be covered by being received in the container room 41 of the pantry box 21.

Furthermore, the filter container body 45 may include an opening 47 for the filter case 130 to be pulled in thereto or pulled out therefrom. The opening 47 may be formed across at least some portions of the bottom plate 21c and the rear plate 21d of the pantry box 21. The opening 47 may be formed across at least a portion of the rear plate 21d of the pantry box 21. The filter case 130 is received in the container room 41. The filter case 130 may be pulled into or pull out from the container room 41 through the opening 47 when the pantry box 21 is moved (see FIG. 7).

A container cover 170 may be combined with the filter container body 45. The container cover 170 is arranged to cover the container room 41. The container cover 170 may be formed by cutting a portion of the filter container body 45. The container cover 170 is formed to cover the container room 41 and the filter case 130 received in the container room 41. A container cover combiner 42 may be arranged in the filter container body 45 to be combined with the container cover 170. The container cover combiner 42 may have a figure corresponding to the edge of the container cover 170. A button part 180 may be arranged in the container cover combiner 42 for combining the container cover 170.

The button part 180 may include a button 181. the button 181 is arranged to correspond to a button recess 182. The button 181 is arranged on the container cover 170. The button recess 182 is formed in the container cover combiner 42. The button recess 182 is formed to be detachably combined with the button 181. The button 181 and the button recess 182 may be combined when the container cover 170 and the container cover combiner 42 are combined, and may be separated when the container cover 170 and the container cover combiner 42 are separated.

The button 181 on the container cover 170 may be combined with the button recess 182 of the container cover combiner 42. The button 181 on the container cover 170 may be separated from the button recess 182 of the container cover combiner 42. The button 181 on the container cover 170 may have the form of a hook that is movable to be separated from the button recess 182 when pressed by the user. Once the button 181 on the container cover 170 is separated from the button recess 182 of the container cover combiner 42, the container cover 170 may be separated from the container cover combiner 42.

In the meantime, the pantry cover 23 may include a first cover 23a and a second cover 23b. The first and second covers 23a and 23b may be combined with the respective rail bodies 51. The second cover 23b may be arranged in front of the first cover 23a. The first and second covers 23a and 23b may be arranged to cover the top of the pantry box 21.

The first cover 23a may be combined with the first cover install part 61 arranged on the rail body 51. The first cover 23a is arranged to cover at least a portion of the pantry box 21.

The second cover 23b may be combined with the second cover install part 62 on the rail body 51. The second cover 23b may be pivotally installed at the second cover install part 62. The second cover 23b is arranged to cover the other portion of the pantry box 21.

The second cover 23b may be pivotally installed at the second cover install part 62 of the rail body 51. The second cover install part 62 of the rail body 51 may include a hinge recess 62a. The second cover 23b may include a hinge shaft 31 corresponding to the hinge recess 62a.

The second cover 23b may be opened or closed by pivoting on the hinge shaft 31 combined with the hinge recess 62a of the rail body 51.

In this regard, the second cover install part 62 may include a pressing member 35 for guiding pivoting of the second cover 23b. The pressing member 35 may include a piston (not shown). The pressing member 35 may be arranged near the hinge recess 62a of the rail body 51. The pressing member 35 is configured to facilitate pivoting of the second cover 23b by pressing the rear side of the second cover 23b. While the pantry cover and the rail member are separately arranged and installed in the refrigerating room and the rail body, respectively, in the embodiment of the present disclosure, the present disclosure is not limited thereto. For example, the pantry cover and the rail member may be integrally formed to cover the top of the pantry box.

A water filtration system 100 may be arranged in the pantry install part 15 to purify water to be supplied to the ice maker 13 or the dispenser (not shown) of the refrigerating storeroom 10a. The water filtration system 100 may be installed in the pantry install part 15 to be covered by the pantry 20. The water filtration system 100 may include the filter case 130 for the water filter 110 to be installed therein. The filter case 130 may be arranged to be received in the filter container 40 of the pantry box 21. The filter case 130 may be arranged in the first direction X of the pantry install part 15. The water filter 110 may be detachably installed in the filter case 130.

The water filter 110 may have the form of a cylinder. The water filter 110 may include a water filter handle 111. The water filter handle 111 is formed for the user to grab the water filter handle 111 in replacing and separating the water filter 110. The water filter 110 may be separable and replaceable when the filter performance degrades from the use. The water filter 110 is configured to be separable from the filter case 130 and replaceable with a new product.

The water filter 110 is configured to be installed in the filter case 130. The filter case 130 includes a filter install part 131 formed for the water filter 110 to be installed by being pulled in thereto. The filter install part 131 may have a cylindrical form that corresponds to the water filter 110. On the inner side of the filter install part 131, guide ribs 132 may be arranged to prevent flowing of a fluid when the water filter 110 is pulled in and pulled out. There may be at least one or more guide ribs 132. The guide ribs 132 may be arranged in the first direction X.

The water filter 110 may be supported by a tray 160. The tray 160 may be arranged in the filter install part 131 inside the filter case 130. The tray 160 may be located under the water filter 110. At least a portion of the tray 160 may have a figure that corresponds to the water filter 110. The tray 160 may be formed to have a round top. A guide rib 132 may be arranged on the tray 160 to guide movement of the water filter 110. The guide rib 132 may be arranged in a moving direction of the water filter 110. The guide rib 132 may be arranged to support the lower portion of the water filter 110.

The water filtration system 100 may include a water tank 140 connected to the water filter 110. The water tank 140 may be arranged in the pantry install part 15 to be covered by the pantry box 21. The water tank 140 may be arranged in the second direction Y of the pantry install part 15. The filter case 130 and the water tank 140 may be arranged perpendicularly to each other. The filter case 130 and the water tank 140 are arranged to be covered by the pantry box 21.

A first connection valve 120 connected to the water filter 110 may be arranged in the filter case 130. The first connection valve 120 is configured to be connected to the water filter 110 as soon as the water filter 110 is installed in the filter case 130. The first connection valve 120 may include a first connector 121 connected to a first connection tube 201 allowing water inflow from an external water source (not shown), and a second connector 122 connected through the second connection tube 202 for the water to be purified and discharged. The second connection tube 202 of the second connector 122 is configured to connect the gap between the water filter 110 and the water tank 140.

The water flowing into the water filter 110 through the first connection tube 201 is purified by the water filter 110. The purified water from the water filter 110 may be stored in the water tank 140 via the second connection tube 202.

A second connection valve 150 may be arranged in the water tank 140 to discharge the purified water stored in the water tank 140. The second connection valve 150 may be connected to a third connection tube 203. The third connection tube 203 may be connected through a third connector 151 of the second connection valve 150. The purified water stored in the water tank 140 may be supplied to the ice maker 13 or the dispenser through the third connection tube 203 connected to the second connection valve.

A water tank cover 141 may be further included to cover the water tank 140. The water tank cover 141 may be arranged in the second direction Y of the pantry install part 15. The water tank cover 141 may be arranged perpendicularly to the filter case 130. The water tank cover 141 may be covered by the pantry box 21.

Figure 9:
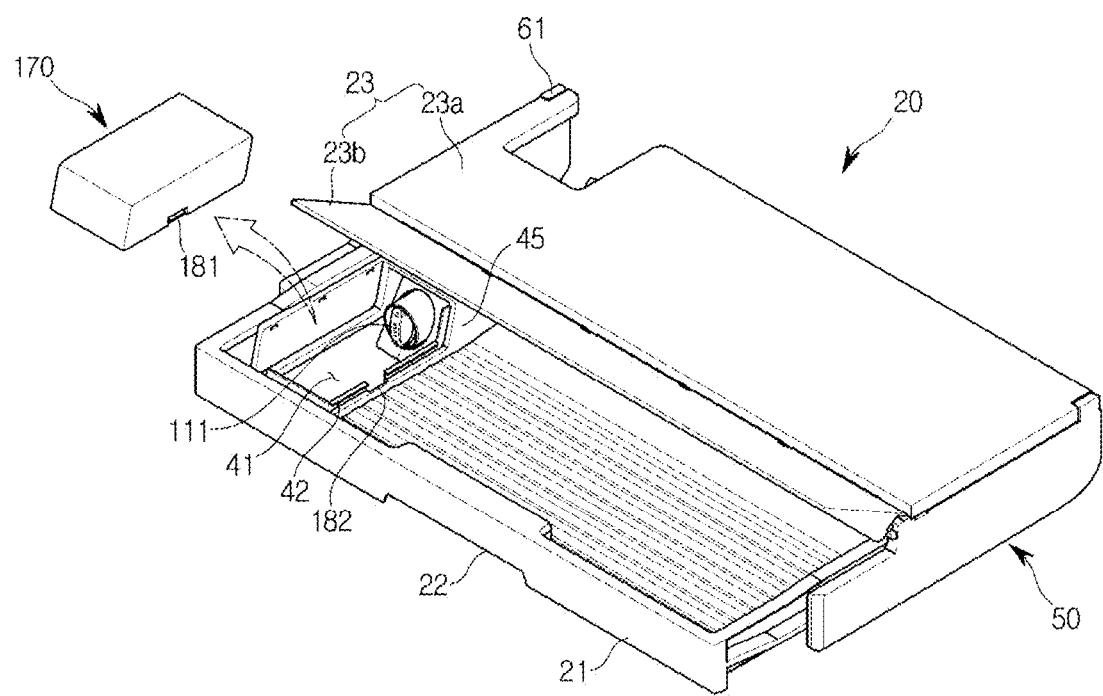
FIG. 9 illustrates a water filter exposed by opening a pantry cover, according to an embodiment of the present disclosure.
Figure 10:
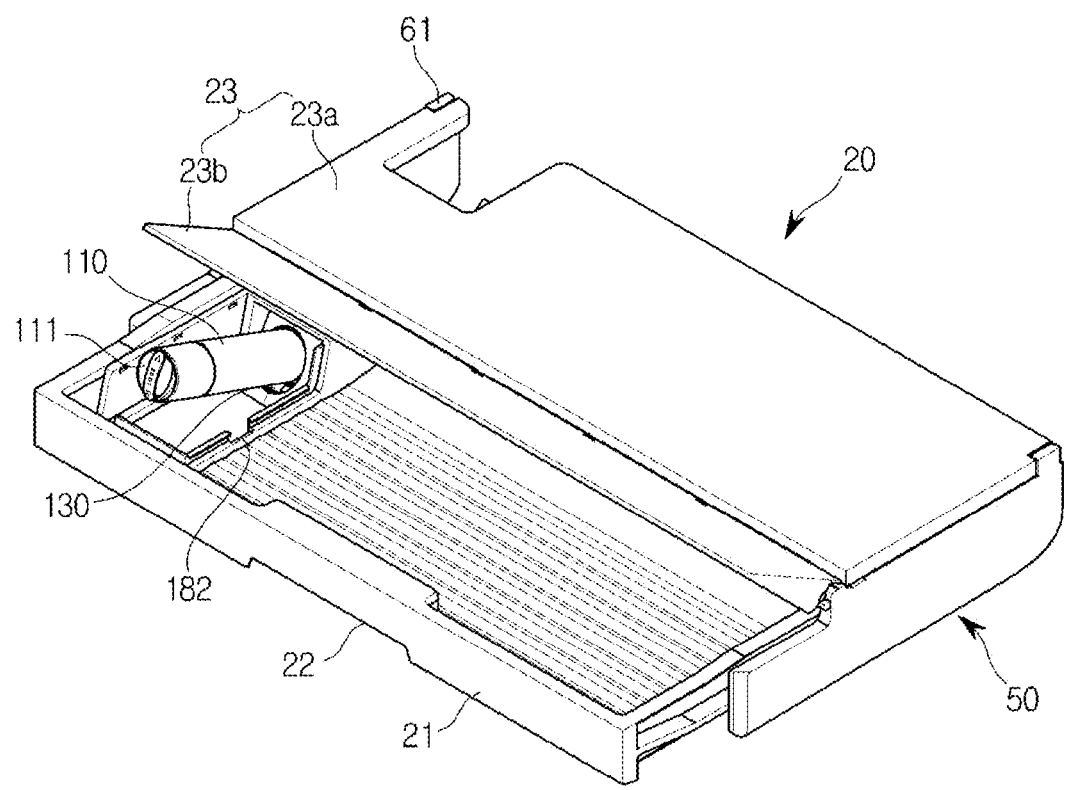
FIG. 10 illustrates a state of separating a water filter from a filter case, according to an embodiment of the present disclosure.

FIG. 9 illustrates a water filter exposed by opening a pantry cover, according to an embodiment of the present disclosure, and FIG. 10 illustrates a state of separating a water filter from a filter case, according to an embodiment of the present disclosure.

Referring to FIGS. 9 and 10, operation of separating and replacing the water filter 110 from the filter case 130 will now be described.

In separating and replacing the water filter 110 covered by the pantry 20, the user may pull the handle 22 of the pantry box 21 to move the pantry box 21.

The pantry box 21 is moved forward from the refrigerator 1, i.e., in the first direction X.

At the same time with the movement of the pantry box 21, the second cover 23b of the pantry cover 23 starts pivoting.

When the pantry box 21 is moved forward, the container cover 170 arranged to cover the filter container 40 of the pantry box 21 is exposed to the user. The user may then press the exposed button 181 on the container cover 170 to separate the button 181 from the button recess 182 formed in the container cover combiner 42, and separate the container cover 170 from the container cover combiner 42.

Once the container cover 170 is opened, the filter case 130 installed in the pantry install part 15 is exposed to the user.

When the user grabs and pulls the water filter handle 111 of the water filter 110 installed on the filter case 130, the water filter 110 is moved forward and separated from the filter case 130.

The user may pull a new water filter 110 for replacement into the filter install part 131 of the filter case 130 to install the new water filter 110. The new water filter 110 may be stably pulled in by the guide rib 132 arranged in the filter install part 131.

Although the container cover 170 is separated from the container cover combiner 42 using the button part 180 in the embodiment of the present disclosure, the present disclosure is not limited thereto. For example, the container cover 170 may include other various structures, such as a hinge or a rail.

Figure 11:
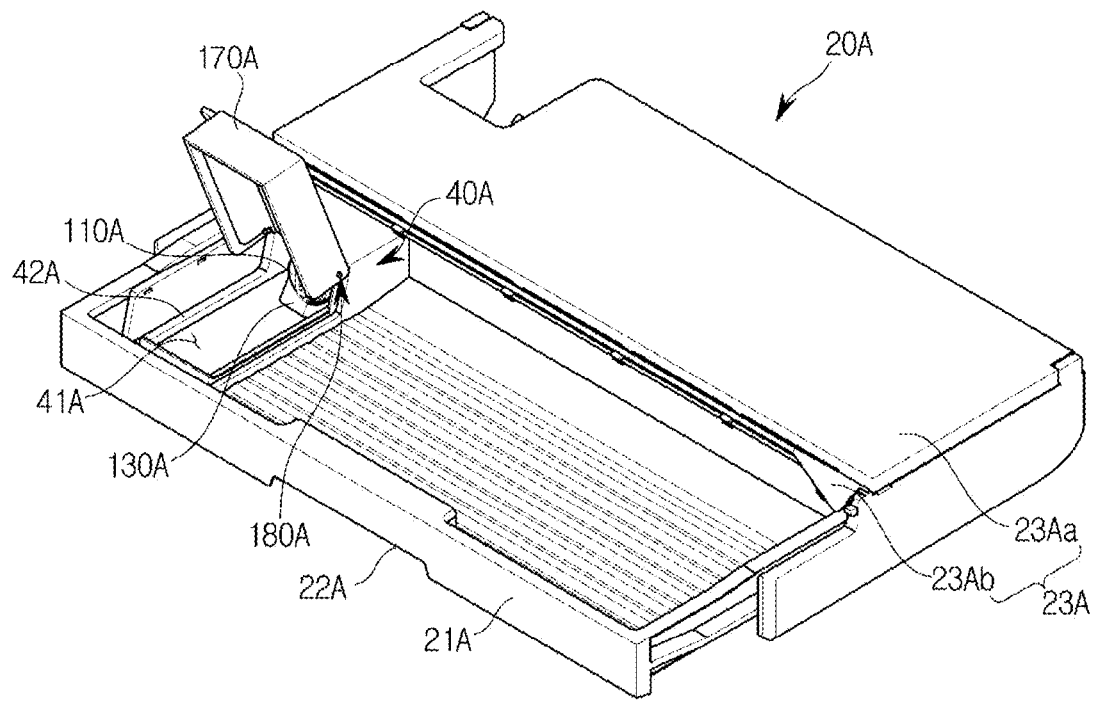
FIG. 11 illustrates a perspective view of a container cover installed in a pantry box, according to an embodiment of the present disclosure.
Figure 12:
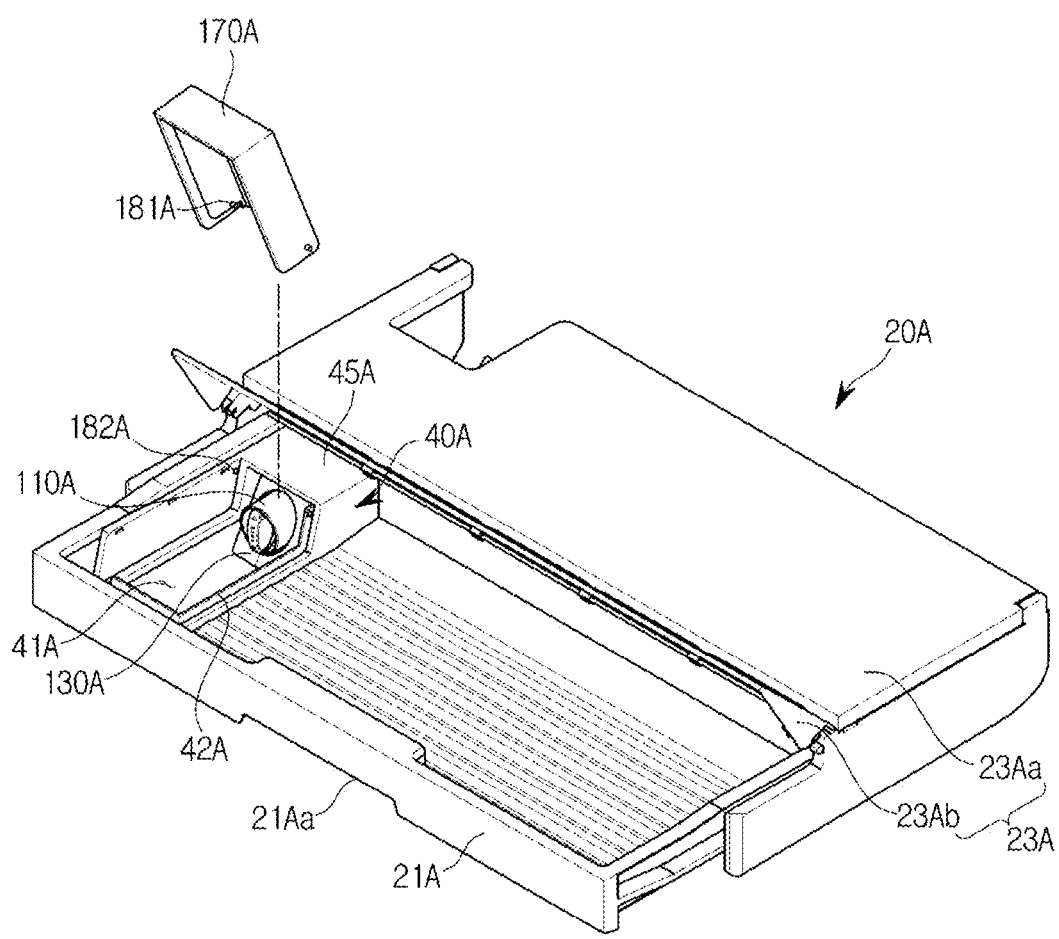
FIG. 12 illustrates a container cover separated from a container cover combiner of a pantry box, according to an embodiment of the present disclosure.
Figure 13:
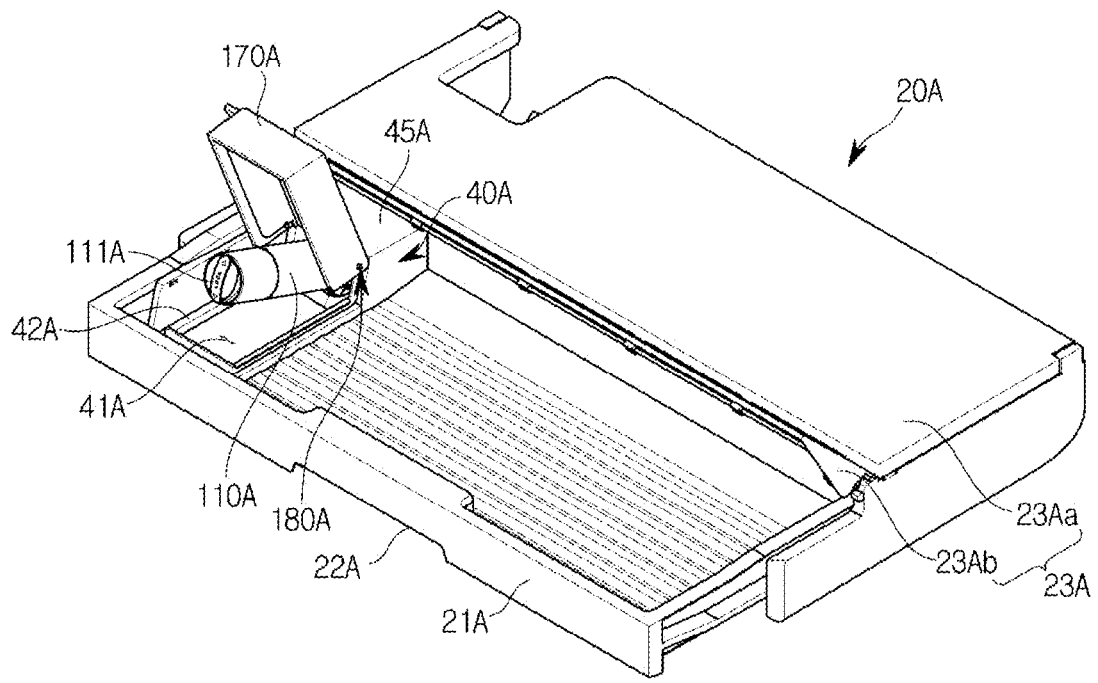
FIG. 13 illustrates a state of separating a water filter from a filter case, according to another embodiment of the present disclosure.
Figure 14:
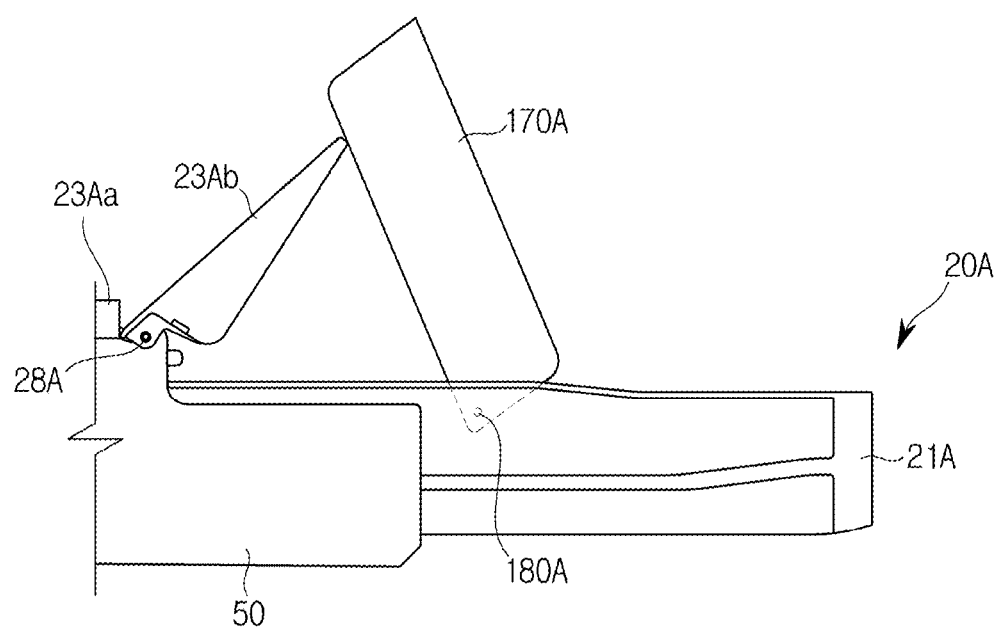
FIG. 14 illustrates a schematic holding structure for a container cover, according to an embodiment of the present disclosure.

FIG. 11 illustrates a perspective view of a container cover installed in a pantry box, according to an embodiment of the present disclosure, FIG. 12 illustrates a container cover separated from a container cover combiner of a pantry box, according to an embodiment of the present disclosure, FIG. 13 illustrates a state of separating a water filter from a filter case, according to another embodiment of the present disclosure, and FIG. 14 illustrates a schematic docking structure of a container cover, according to an embodiment of the present disclosure. Reference numerals not shown in FIGS. 11 to 14 may be referred to from FIGS. 1 to 10.

Referring to FIGS. 11 and 14, operation of separating and replacing a water filter 110A from a filter case 130A will now be described.

In separating and replacing the water filter 110A covered by a pantry 20A, the user may pull a handle 22A of a pantry box 21A to move the pantry box 21A. The pantry box 21A is moved forward from the refrigerator 1, i.e., in the first direction X.

At the same time with the movement of the pantry box 21A, a second cover 23Ab of the pantry cover 23A starts pivoting. When the pantry box 21A is moved forward, a container cover 170A arranged to cover a filter container 40A of the pantry box 21A is exposed. The user may separate the container cover 170A from a container cover combiner 42A by pivoting the container cover 170A.

The container cover 170A may be hinged with the filter container 40A. The container cover 170A may be hinged with the container cover combiner 42A. The container cover 170A is combined with the container cover combiner 42A by a hinge part 180A.

The hinge part 180A may be arranged to allow the container cover 170A to be able to pivot. The hinge part 180A may include a hinge protrusion 181A formed on the container cover 170A and a hinge recess 182A formed in the container cover combiner 42A. The hinge recess 182A may be formed at a position corresponding to the hinge protrusion 181A.

The filter container 40A includes a filter container body 45A. The filter container body 45A may include a container room 41A formed to receive the filter case 130A therein. The filter container body 45A may include an opening 47A formed for the filter case 130A to be pulled in thereto or pulled out therefrom.

The filter case 130A installed in the pantry install part 15 of the refrigerator 1 may be exposed to the user as the container cover 170A pivots.

When the user grabs and pulls a water filter handle 111A of a water filter 110A installed in the filter case 130A, the water filter 110A is moved forward and separated from the filter case 130A.

The user may pull a new water filter 110A for replacement into the filter case 130A to install the new water filter 110A.

In the meantime, as shown in FIG. 14, the second cover 23Ab of the pantry cover 23A may be arranged to support the container cover 170A when the container cover 170A is opened from the filter container 40 by the hinge part 180A.

The second cover 23Ab is configured to pivot on a second cover pivot shaft 28A. At least a portion of the second cover 23Ab comes into contact with at least a portion of the container cover 170A that is opened by pivoting, to hold the container cover 170A.

Figure 15:
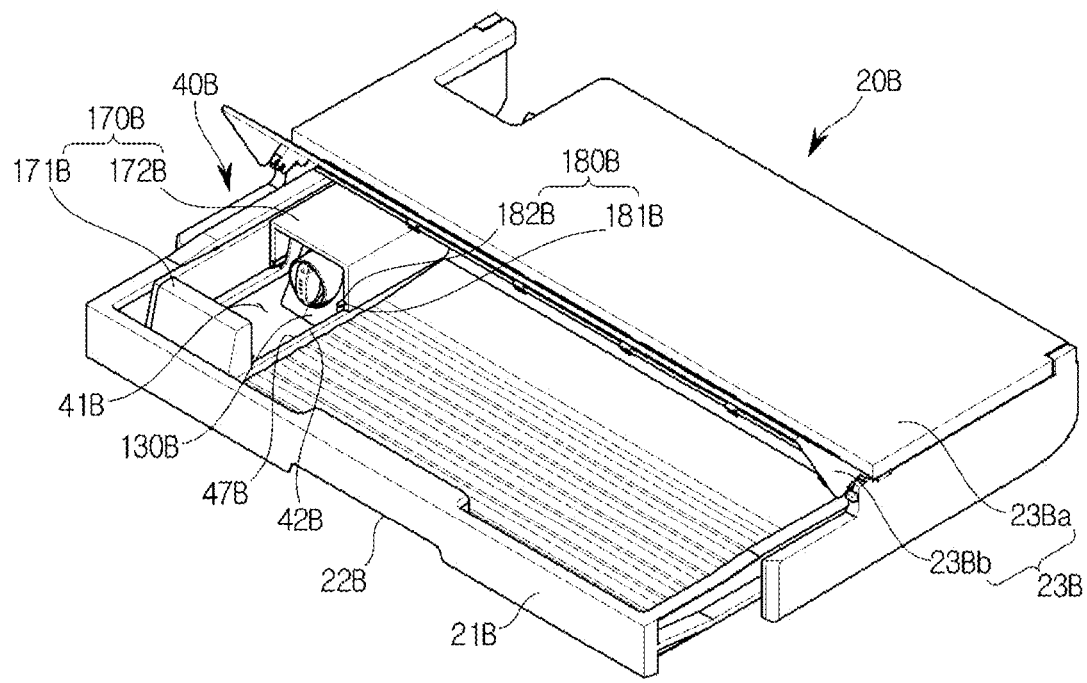
FIG. 15 illustrates a perspective view of a container cover installed in a pantry box, according to an embodiment of the present disclosure.
Figure 16:
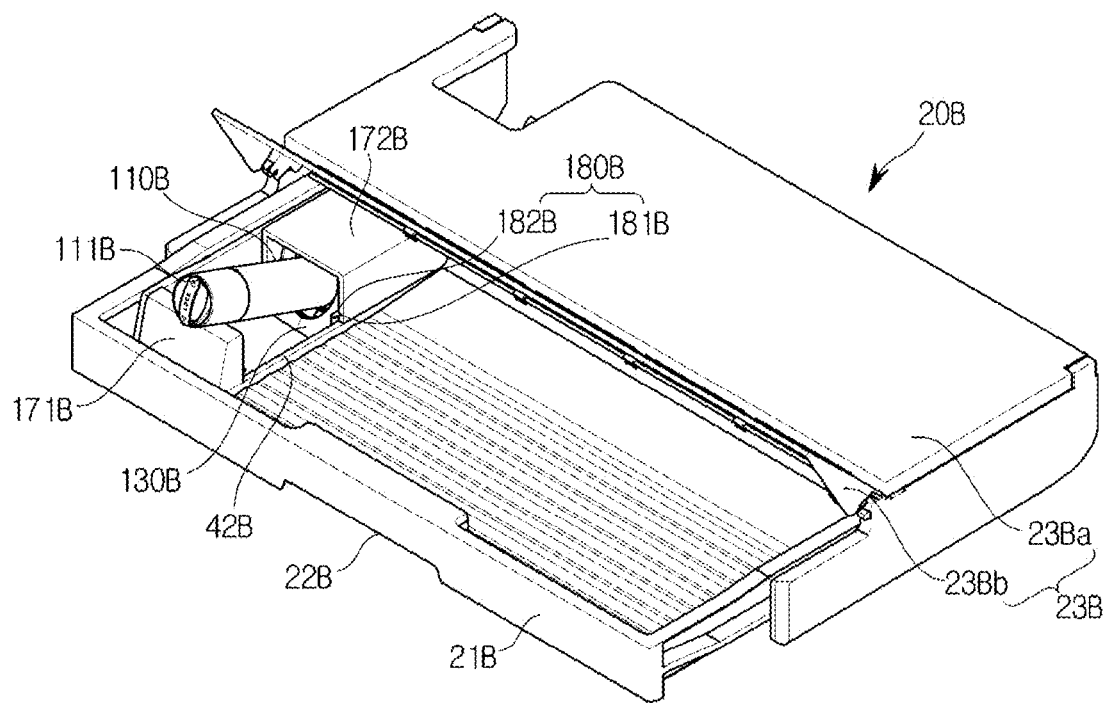
FIG. 16 illustrates a state of separating a water filter from a filter case, according to another embodiment of the present disclosure.

FIG. 15 illustrates a perspective view of a container cover installed in a pantry box, according to an embodiment of the present disclosure, and FIG. 16 illustrates a state of separating a water filter from a filter case, according to another embodiment of the present disclosure. Reference numerals not shown in FIGS. 15 and 16 may be referred to from FIGS. 1 to 10.

Referring to FIGS. 15 and 16, operation of separating and replacing a water filter 110B from a filter case 130B will now be described. In separating and replacing the water filter 110B covered by a pantry box 20B, the user may pull a handle 22B of a pantry box 21B to move the pantry box 21B. The pantry box 21B is moved in the first direction X of the refrigerator 1.

At the same time with the movement of the pantry box 21B, a second cover 23Bb of the pantry cover 23B starts pivoting.

When the pantry box 21B is moved forward, a container cover 170B arranged to cover a filter container 40B of the pantry box 21B is exposed. The user may move the container cover 170B to expose a container room 41B covered by the container cover 170B.

The filter container 40B includes the filter container body 45. The filter container body 45 may include a container room 41B formed to receive the filter case 130B therein. The filter container body 45 may include an opening formed for the filter case 130B to be pulled in thereto or pulled out therefrom.

The filter case 130B installed in the pantry install part 15 of the refrigerator 1 may be exposed to the user as the container cover 170B moves.

The container cover 170B may include a first cover 171B and a second cover 172B.

The first and second covers 171A and 172B are combined to cover the container room 41B of the filter container 40B.

The first cover 171B is fixed on the pantry box 20B so that the first cover 171B is able to move along with the pantry box 20B when the pantry box 20B is moved. The second cover 172B may be combined with the container cover combiner 47B to be able to slide.

The container cover 170B is combined with the container cover combiner 47B by a rail part 180B. The container cover 170B may be configured to be movable by the rail part 180B to cover the container room 41B and the filter case 130B.

The rail part 180B may include a first rail 181B arranged on the container cover 170B and a second rail 182B arranged on the container cover combiner 47B. The first rail 181B is arranged on the second cover 172B.

Accordingly, when the pantry box 21B is opened by being moved in the first direction X, the first cover 171B of the container cover 170B is moved forward along with the pantry box 21B and the second cover 172B is moved backward to expose the container room 41B.

In this way, as the first cover 171B and the second cover 172B of the container cover 170B are moved in the opposite directions, the container room 41B is opened and the filter case 130B contained in the container room 41B is exposed.

At the same time, the water filter 110B installed in the filter case 130B is exposed.

The user may grab a water filter handle 111B of the water filter 110B and move the water filter 110B forward to be separated and replaced.

According to embodiments of the present disclosure, a refrigerator may have an improved exterior with a pantry arranged to cover a water filtration system.

Furthermore, with a pantry box placed to cover the water filtration system, internal capacity of the storeroom may be improved.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:
   a storeroom configured to have a pantry install portion;
   a filter case arranged in the pantry install portion and configured to receive a water filter; and
   a pantry arranged in the pantry install portion and configured to be drawn into or out of the pantry install portion, wherein the pantry includes:
      a container room configured to accommodate the filter case, wherein the container room is moved into or pulled out from the pantry install portion corresponding to when the pantry is moved into or pulled out from the pantry install portion, and
      a container cover configured to selectively cover the filter case such that the water filter is exposed to an outside of the container room in response to the container cover being opened when the pantry is drawn out of the pantry install portion.

2. The refrigerator of claim 1, wherein the pantry comprises:
   a pantry box; and
   a pantry cover configured to cover the pantry box.

3. The refrigerator of claim 2, wherein at least a portion of the filter case is covered by the pantry box.

4. The refrigerator of claim 2, wherein the pantry box comprises the container room.

5. The refrigerator of claim 4, wherein the pantry comprises a filter container body arranged in the pantry box to form the container room to receive the filter case.

6. The refrigerator of claim 5, wherein the filter container body comprises an opening formed for the filter case to be pulled in or pulled out.

7. The refrigerator of claim 6, wherein the opening is formed in at least a portion of a rear side of the pantry box.

8. The refrigerator of claim 1, wherein the water filter is detachably installed in the filter case.

9. The refrigerator of claim 1, further comprising a water tank connected to the water filter.

10. The refrigerator of claim 9, wherein the water tank is arranged in the pantry install portion to be covered by the pantry.

11. The refrigerator of claim 9, wherein the water filter and the water tank are arranged perpendicularly to each other.

12. The refrigerator of claim 9, wherein the water filter is arranged in a front-back direction of the storeroom, and the water tank is arranged in a left-right direction of the storeroom.

13. A refrigerator comprising:
   a storeroom;
   a pantry box including a container room, and arranged in a pantry install portion to be pushed in and pulled out from the storeroom;
   a filter case configured to receive a water filter, and arranged in the pantry box to be received by the container room in response to the pantry box being pushed in the storeroom; and
   a water tank connected to the water filter and arranged to be covered by the pantry box,
   wherein the container room is configured to accommodate the filter case, and
   wherein the container room moved into or pulled out from the storeroom corresponding to when the pantry box is pushed in or pulled out from the storeroom.

14. The refrigerator of claim 13, wherein the water filter is detachably installed in the filter case.

15. The refrigerator of claim 13, wherein the container room comprises:
   a filter container body arranged in the pantry box to receive the filter case, and
   an opening formed in the filter container body for the filter case to be pulled in or pulled out.

16. The refrigerator of claim 15, further comprising: a pantry cover configured to cover an upper portion of the pantry box.

17. The refrigerator of claim 16, wherein at least a portion of the water tank is covered by the pantry cover.

18. The refrigerator of claim 16, further comprising: a container cover detachably installed to cover the container room.

19. The refrigerator of claim 16, wherein the opening is formed in at least a portion of a rear side of the pantry box.

* * * * *